(12) United States Patent
Lee et al.

(10) Patent No.: US 8,248,924 B2
(45) Date of Patent: Aug. 21, 2012

(54) UPLINK ACCESS METHOD OF MOBILE COMMUNICATION SYSTEM

(75) Inventors: Young-Dae Lee, Gyeonggi-Do (KR); Sung-Duck Chun, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 890 days.

(21) Appl. No.: 12/305,909

(22) PCT Filed: Jun. 21, 2007

(86) PCT No.: PCT/KR2007/003020
§ 371 (c)(1),
(2), (4) Date: Dec. 19, 2008

(87) PCT Pub. No.: WO2007/148933
PCT Pub. Date: Dec. 27, 2007

(65) Prior Publication Data
US 2010/0232335 A1    Sep. 16, 2010

Related U.S. Application Data

(60) Provisional application No. 60/815,722, filed on Jun. 21, 2006.

(30) Foreign Application Priority Data

Apr. 24, 2007  (KR) .................. 10-2007-0039943

(51) Int. Cl.
*H04J 3/14* (2006.01)
(52) U.S. Cl. ......... 370/229; 370/310; 370/312; 370/328

(58) Field of Classification Search .................. 370/229, 370/230, 310, 310.2, 311, 312, 328, 329, 370/349
See application file for complete search history.

(56) References Cited

U.S. PATENT DOCUMENTS

| | | | |
|---|---|---|---|
| 6,138,158 A | 10/2000 | Boyle et al. | |
| 6,317,430 B1 | 11/2001 | Knisely et al. | |
| 6,381,229 B1 | 4/2002 | Narvinger et al. | |
| 6,480,525 B1 | 11/2002 | Parsa et al. | |

(Continued)

FOREIGN PATENT DOCUMENTS

CN    1411668    4/2003

(Continued)

OTHER PUBLICATIONS

3rd Generation Partnership Project (3GPP), "Technical Specification Group Radio Access Network; Introduction of the Multimedia Broadcast Multicast Service(MBMS) in the Radio Access Network (RAN); Stage 2 (Release 6)", 3GPP TS 25.346 V6.7.0, Dec. 2005.

(Continued)

*Primary Examiner* — Kwang B Yao
*Assistant Examiner* — Nguyen Ngo
(74) *Attorney, Agent, or Firm* — Lee, Hong, Degerman, Kang & Waimey

(57) ABSTRACT

In a wireless mobile communications system, a network transmits a response request message with respect to a particular point-to-multipoint service to a terminal, and then the terminal transmits a response message to the network using an allocated uplink access preamble included in the response request message, thereby effectively performing a counting procedure with respect to the particular broadcast service at a minimum overhead.

27 Claims, 4 Drawing Sheets

U.S. PATENT DOCUMENTS

| | | |
|---|---|---|
| 6,571,102 B1 | 5/2003 | Hogberg et al. |
| 6,597,668 B1 | 7/2003 | Schafer et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,236,787 B1 | 6/2007 | Tamura et al. |
| 7,239,870 B2 | 7/2007 | Zhang et al. |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,729,719 B2 | 6/2010 | Bergstrom et al. |
| 7,826,859 B2 | 11/2010 | Lee et al. |
| 7,848,308 B2 | 12/2010 | Lee et al. |
| 7,881,724 B2 | 2/2011 | Park et al. |
| 8,031,668 B2 | 10/2011 | Wang et al. |
| 8,036,110 B2 | 10/2011 | Ishii et al. |
| 8,068,511 B2 | 11/2011 | Reznik et al. |
| 8,090,382 B2 | 1/2012 | Park et al. |
| 2001/0024956 A1 | 9/2001 | You |
| 2001/0046864 A1 | 11/2001 | Bhatoolaul et al. |
| 2002/0009129 A1 | 1/2002 | Choi et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang |
| 2002/0071480 A1 | 6/2002 | Marjelund et al. |
| 2002/0090004 A1 | 7/2002 | Rinchiuso |
| 2002/0093940 A1 | 7/2002 | Toskala |
| 2002/0116515 A1 | 8/2002 | Hashimoto |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim |
| 2002/0187789 A1 | 12/2002 | Diachina |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0210669 A1 | 11/2003 | Vayanos et al. |
| 2003/0223393 A1 | 12/2003 | Lee |
| 2003/0236085 A1 | 12/2003 | Ho |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0146019 A1* | 7/2004 | Kim et al. ............... 370/329 |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0171395 A1 | 9/2004 | Shin |
| 2004/0180675 A1 | 9/2004 | Choi et al. |
| 2004/0184437 A1 | 9/2004 | Lee et al. |
| 2004/0185860 A1 | 9/2004 | Marjelund |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0014508 A1 | 1/2005 | Moulsley et al. |
| 2005/0020260 A1* | 1/2005 | Jeong et al. ............... 455/434 |
| 2005/0025039 A1 | 2/2005 | Hwang et al. |
| 2005/0039101 A1 | 2/2005 | Torsner |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0157696 A1 | 7/2005 | Yamamoto et al. |
| 2005/0185608 A1 | 8/2005 | Lee et al. |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0207374 A1 | 9/2005 | Petrovic et al. |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0250500 A1 | 11/2005 | Xu |
| 2005/0260997 A1 | 11/2005 | Korale |
| 2005/0265301 A1 | 12/2005 | Heo et al. |
| 2005/0271025 A1 | 12/2005 | Guethaus et al. |
| 2005/0281212 A1 | 12/2005 | Jeong et al. |
| 2005/0288026 A1 | 12/2005 | Byun et al. |
| 2006/0007886 A1 | 1/2006 | Lee et al. |
| 2006/0018289 A1 | 1/2006 | Schulist et al. |
| 2006/0025079 A1 | 2/2006 | Sutskover et al. |
| 2006/0030342 A1* | 2/2006 | Hwang et al. ............... 455/466 |
| 2006/0045047 A1 | 3/2006 | Choi et al. |
| 2006/0056347 A1* | 3/2006 | Kwak et al. ............... 370/329 |
| 2006/0059186 A1 | 3/2006 | Backlund |
| 2006/0062196 A1 | 3/2006 | Cai et al. |
| 2006/0072494 A1 | 4/2006 | Matusz |

| | | | | | | |
|---|---|---|---|---|---|---|
| 2006/0083183 A1 | 4/2006 | Teague et al. | | JP | 2003504968 | 2/2003 |
| 2006/0088009 A1 | 4/2006 | Gibbs et al. | | JP | 2003078480 | 3/2003 |
| 2006/0120403 A1 | 6/2006 | Murata et al. | | JP | 2003-116172 | 4/2003 |
| 2006/0143300 A1 | 6/2006 | See et al. | | JP | 2003-174470 | 6/2003 |
| 2006/0146745 A1 | 7/2006 | Cai et al. | | JP | 2003-333661 | 11/2003 |
| 2006/0153232 A1 | 7/2006 | Shvodian | | JP | 2004-128967 | 4/2004 |
| 2006/0154680 A1* | 7/2006 | Kroth et al. ............. 455/515 | | JP | 2004-312771 | 11/2004 |
| 2006/0168343 A1 | 7/2006 | Ma et al. | | JP | 2004-349884 | 12/2004 |
| 2006/0193282 A1 | 8/2006 | Ikawa et al. | | JP | 2005-500761 | 1/2005 |
| 2006/0256818 A1 | 11/2006 | Shvodian et al. | | JP | 2005510950 | 4/2005 |
| 2006/0292982 A1 | 12/2006 | Ye et al. | | JP | 2005-517369 | 6/2005 |
| 2007/0071025 A1* | 3/2007 | Bergstrom et al. ......... 370/448 | | JP | 2005522923 | 7/2005 |
| 2007/0081483 A1 | 4/2007 | Jang et al. | | JP | 2005-217743 | 8/2005 |
| 2007/0081513 A1 | 4/2007 | Torsner | | JP | 2005525720 | 8/2005 |
| 2007/0098006 A1 | 5/2007 | Parry et al. | | JP | 2005-236988 | 9/2005 |
| 2007/0099619 A1 | 5/2007 | Parekh et al. | | JP | 2005-237013 | 9/2005 |
| 2007/0104151 A1 | 5/2007 | Papasakellariou et al. | | JP | 2005-244958 | 9/2005 |
| 2007/0117579 A1* | 5/2007 | Cai et al. ............... 455/509 | | JP | 2005-278167 | 10/2005 |
| 2007/0135080 A1 | 6/2007 | Islam et al. | | JP | 2005-536168 | 11/2005 |
| 2007/0140115 A1 | 6/2007 | Bienas et al. | | JP | 2005-539462 | 12/2005 |
| 2007/0147326 A1 | 6/2007 | Chen | | JP | 2006-014372 | 1/2006 |
| 2007/0206531 A1 | 9/2007 | Pajukoski et al. | | JP | 2006-020044 | 1/2006 |
| 2007/0218930 A1* | 9/2007 | Kuo ...................... 455/466 | | JP | 2006-025437 | 1/2006 |
| 2007/0254662 A1 | 11/2007 | Khan et al. | | JP | 2006-505998 | 2/2006 |
| 2007/0274253 A1 | 11/2007 | Zhang et al. | | JP | 2006-352705 | 12/2006 |
| 2008/0031253 A1 | 2/2008 | Kim et al. | | JP | 2007536790 | 12/2007 |
| 2008/0069031 A1 | 3/2008 | Zhang et al. | | JP | 2009-284532 | 12/2009 |
| 2008/0095105 A1 | 4/2008 | Sundberg et al. | | KR | 10-2001-0111634 | 12/2001 |
| 2008/0130643 A1 | 6/2008 | Jain et al. | | KR | 10-2001-0111637 | 12/2001 |
| 2008/0137564 A1 | 6/2008 | Herrmann | | KR | 1020010111637 | 12/2001 |
| 2008/0212541 A1 | 9/2008 | Vayanos et al. | | KR | 10-2004-0048675 | 6/2004 |
| 2008/0232291 A1 | 9/2008 | Hus et al. | | KR | 10-2004-0064867 | 7/2004 |
| 2008/0267136 A1* | 10/2008 | Baker et al. ............. 370/336 | | KR | 10-2004-0089937 | 10/2004 |
| 2009/0011769 A1 | 1/2009 | Park et al. | | RU | 2168278 | 5/2001 |
| 2009/0175241 A1 | 7/2009 | Ohta et al. | | RU | 2191479 | 10/2002 |
| 2009/0185477 A1 | 7/2009 | Lee et al. | | RU | 2232469 | 7/2004 |
| 2009/0319850 A1 | 12/2009 | Baek et al. | | RU | 2232477 | 7/2004 |
| 2009/0323624 A1* | 12/2009 | Kim ..................... 370/329 | | RU | 2237380 | 9/2004 |
| 2009/0323646 A1 | 12/2009 | Ketchum et al. | | RU | 2263415 | 10/2005 |
| 2010/0014430 A1 | 1/2010 | Oka et al. | | RU | 2270526 | 2/2006 |
| 2010/0034095 A1 | 2/2010 | Ho et al. | | RU | 2009106289 | 8/2010 |
| 2010/0103899 A1 | 4/2010 | Kwak et al. | | TW | 407407 | 10/2000 |
| 2010/0105334 A1 | 4/2010 | Terry et al. | | TW | 548916 | 8/2003 |
| 2010/0226263 A1 | 9/2010 | Chun et al. | | TW | 552815 | 9/2003 |
| 2011/0038376 A1 | 2/2011 | Wiemann et al. | | TW | 586283 | 5/2004 |
| | | | | TW | 589818 | 6/2004 |
| | | | | TW | 592412 | 6/2004 |
| FOREIGN PATENT DOCUMENTS | | | | TW | I228008 | 2/2005 |
| CN | 1649285 | 8/2005 | | TW | I229268 | 3/2005 |
| CN | 1658545 | 8/2005 | | TW | 200522579 | 7/2005 |
| CN | 1663158 | 8/2005 | | TW | I237478 | 8/2005 |
| CN | 1692661 | 11/2005 | | TW | I242951 | 11/2005 |
| EP | 0978958 | 2/2000 | | TW | I253824 | 4/2006 |
| EP | 1009184 | 6/2000 | | TW | 280755 | 5/2007 |
| EP | 1261222 | 11/2002 | | WO | 9960729 | 11/1999 |
| EP | 1392074 | 2/2004 | | WO | 99/63713 | 12/1999 |
| EP | 1441473 | 7/2004 | | WO | 02/39697 | 5/2002 |
| EP | 1478203 | 11/2004 | | WO | 02/39760 | 5/2002 |
| EP | 1557968 | 7/2005 | | WO | 02/43403 | 5/2002 |
| EP | 1599063 | 11/2005 | | WO | 02/47417 | 6/2002 |
| EP | 1605724 | 12/2005 | | WO | 02075442 | 9/2002 |
| EP | 1684538 | 1/2006 | | WO | 02/102110 | 12/2002 |
| JP | 06-013959 | 1/1994 | | WO | 03/007636 | 1/2003 |
| JP | 06-121001 | 4/1994 | | WO | 03/017691 | 2/2003 |
| JP | 09-055693 | 2/1997 | | WO | 03/043259 | 5/2003 |
| JP | 09-186704 | 7/1997 | | WO | 03/047155 | 6/2003 |
| JP | 09-327072 | 12/1997 | | WO | 03/056723 | 7/2003 |
| JP | 11-308671 | 11/1999 | | WO | 03/096571 | 11/2003 |
| JP | 11-331949 | 11/1999 | | WO | 2004/030393 | 4/2004 |
| JP | 2000-032088 | 1/2000 | | WO | 2004/034656 | 4/2004 |
| JP | 2000-175271 | 6/2000 | | WO | 2004/045234 | 5/2004 |
| JP | 2000-184428 | 6/2000 | | WO | 2004/089030 | 10/2004 |
| JP | 2001-095031 | 4/2001 | | WO | 2004/091130 | 10/2004 |
| JP | 2001522557 | 11/2001 | | WO | 2005/006660 | 1/2005 |
| JP | 2002501695 | 1/2002 | | WO | 2005/018269 | 2/2005 |
| JP | 2002064589 | 2/2002 | | WO | 2005/034418 | 4/2005 |
| JP | 2002-135231 | 5/2002 | | WO | 2005/036917 | 4/2005 |
| JP | 2002-374321 | 12/2002 | | WO | 2005/055472 | 6/2005 |
| JP | 2003-008635 | 1/2003 | | WO | 2005/071887 | 8/2005 |
| JP | 2003504942 | 2/2003 | | | | |

| | | |
|---|---|---|
| WO | 2005/074312 | 8/2005 |
| WO | 2005/088886 | 9/2005 |
| WO | 2005099125 | 10/2005 |
| WO | 05/109837 | 11/2005 |
| WO | 2005/109695 | 11/2005 |
| WO | 05/125125 | 12/2005 |
| WO | 2005/117317 | 12/2005 |
| WO | 2005/119941 | 12/2005 |
| WO | 2006/011953 | 2/2006 |
| WO | 2006/012946 | 2/2006 |
| WO | 2007/095966 | 8/2007 |
| WO | 2007091831 | 8/2007 |

OTHER PUBLICATIONS

Sarkar, S., et al., "Common-Channel Soft Handoff in CDMA2000," IEEE Transactions on Microwave Theory and Techniques, Jun. 2000, pp. 938-950, vol. 48, Issue 6.

NTT Docomo, et al., "Multiplexing Method of Shared Control Channel in Uplink Single-Carrier FDMA Radio Access," 3GPP TSG-RAN WG1, R1-051143, Oct. 10, 2005.

Huawei, "Further Considerations on Multiplexing Method of Shared Control Channel in Uplink Single-Carrier FDMA," 3GPP TSG-RAN WG1, R1-051430, Nov. 7, 2005.

Philips, "Evolved Paging Indicators for LTE," 3GPP TSG-RAN WG2, R2-052985, Nov. 7, 2005.

NTT Docomo, et al., "Paging Channel Structure for E-UTRA Downlink," 3GPP TSG-RAN WG1, R1-060034, Jan. 23, 2006.

LG Electronics Inc., "HARQ and ARQ Operation," 3GPP TSG-RAN WG2, R2-060106, Jan. 9, 2006.

LG Electronics Inc., "Framing in the MAC Entity," 3GPP TSG-RAN WG2, R2-061012, Mar. 27, 2006.

Motorola, "Paging Channel Design for E-UTRA," 3GPP TSG-RAN WG1, R1-061712, Jun. 27, 2006.

Qualcomm, "Need for MAC-hs segmentation mechanism," R2-020769, 3GPP TSG-RAN WG2 meeting #28, Apr. 2002.

Motorola et al., "MAC-e/es header and functional split," R2-042360, 3GPP TSG Ran WG2 Meeting#45, Nov. 2004.

Ericsson, "User plane protocol enhancements," R2-052749, TSG-RAN WG2 Meeting #48bis, Oct. 2005.

LG Electronics Inc., "MAC Enhancement," R2-060561, 3GPP TSG-RAN WG2 #51, Feb. 2006.

IPWireless, "Layer 2 functions for LTE," R2-052377, 3GPP TSG RAN WG2 #48bis, Oct. 2005.

LG Electronics Inc., "MAC Architecture of LTE," R2-060105, 3GPP TSG-RAN WG2 #50, Jan. 2006.

LG Electronics Inc., "HARQ and ARQ Operation," R2-060563, 3GPP TSG-RAN WG2 #51, Feb. 2006.

LG Electronics Inc., "Discussion on RLC PDU Structure," R2-070721, 3GPP TSG-RAN WG2 #57, Feb. 2007.

Ericsson, "Solution for sending NAS together with RRC connection request," R2-071817, 3GPP TSG-RAN WG2#58, May 2007.

LG Electronics Inc., "Default SRB for initial access," R2-061958, 3GPP TSG-RAN WG2 LTE Ad-hoc, Jun. 2006.

Siemens, "States in E-UTRAN," R2-052051, 3GPP TSG-RAN WG RAN2#48, Aug. 2005.

China Mobile Communications Co., "RRC States Analysis in LTE," R2-052140, 3GPP TSG RAN WG2 #48, Aug. 2005.

Qualcomm Europe, "Signaling optimization for E-UTRAN," R2-052407, 3GPP TSG-RAN WG 2 meeting #48-bis, Oct. 2005.

Panasonic, "E-UTRA Transport and Logical Channels," R2-052860, 3GPP TSG RAN WG2#49, Nov. 2005.

Ericsson, "E-UTRA Random Access"; TSG-RAN WG1 #43; Seoul, Korea; Nov. 2005; R1-051445.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321, V8.4.0, Dec. 2008.

LG Electronics Inc., "UE State Transition in LTE_ACTIVE," R2-061002, 3GPP TSG-RAN WG2 #52, Mar. 2006.

M. Haardt et al., "The TD-CDMA Based UTRA TDD Mode," IEEE Journal on Selected Areas in Communications, vol. 18, No. 8, pp. 1375-1385, Aug. 2000.

Xu, H., et al.; "Performance Analysis on the Radio Link Control Protocol of UMTS System"; 2002 IEEE 56th Vehicular Technology Conference Proceedings; pp. 2026-2030; Sep. 2002.

* cited by examiner

[Fig. 1]
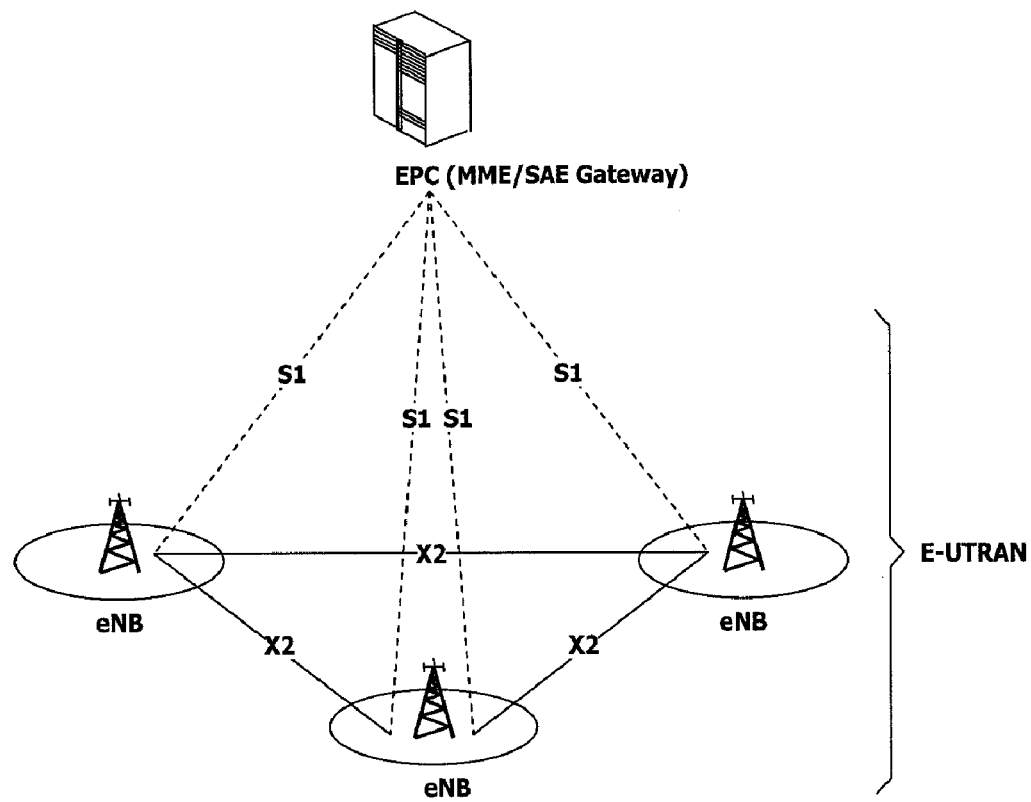
[Fig. 2]
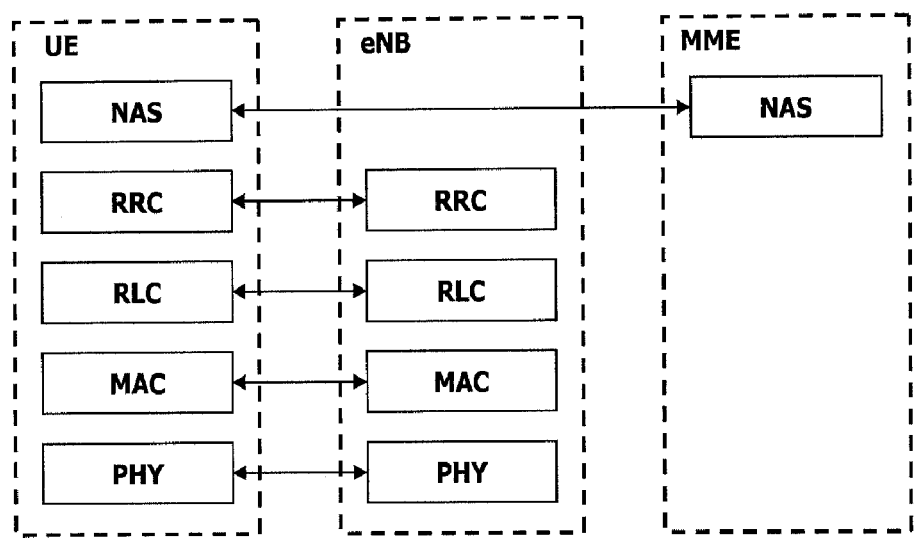

[Fig. 3]
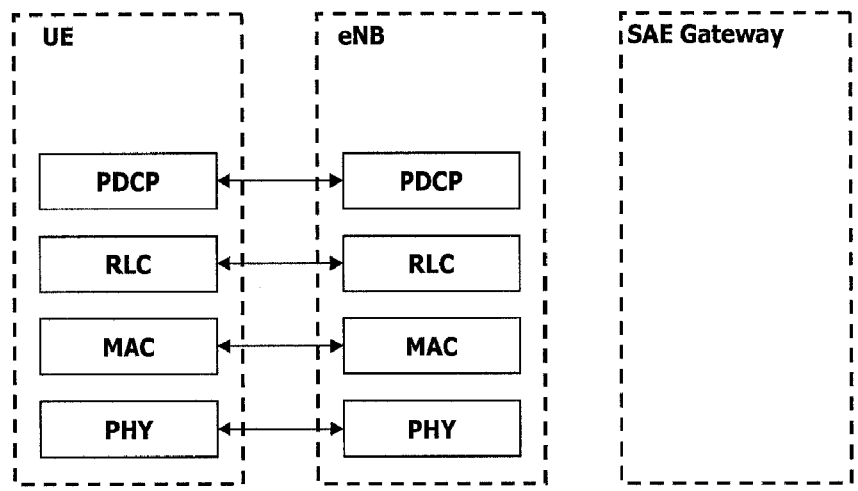
[Fig. 4]
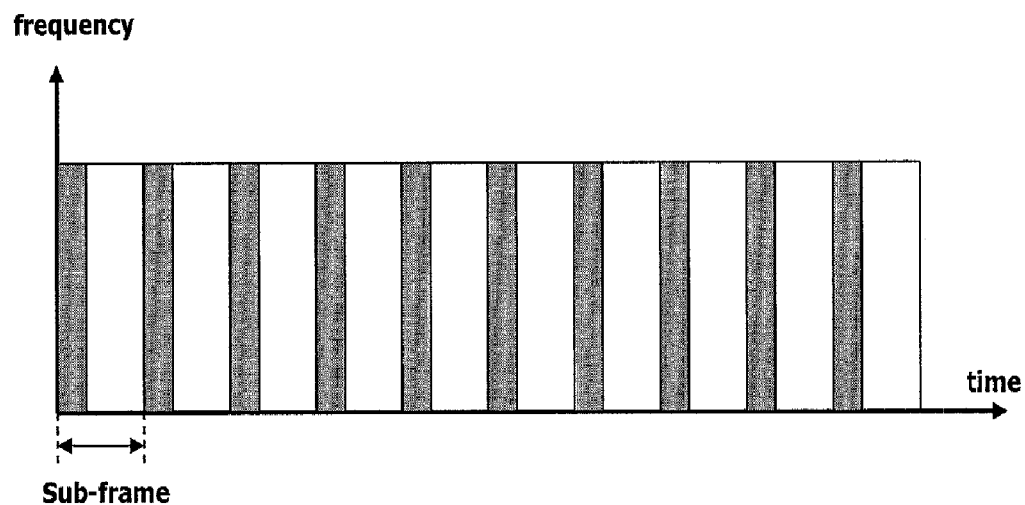

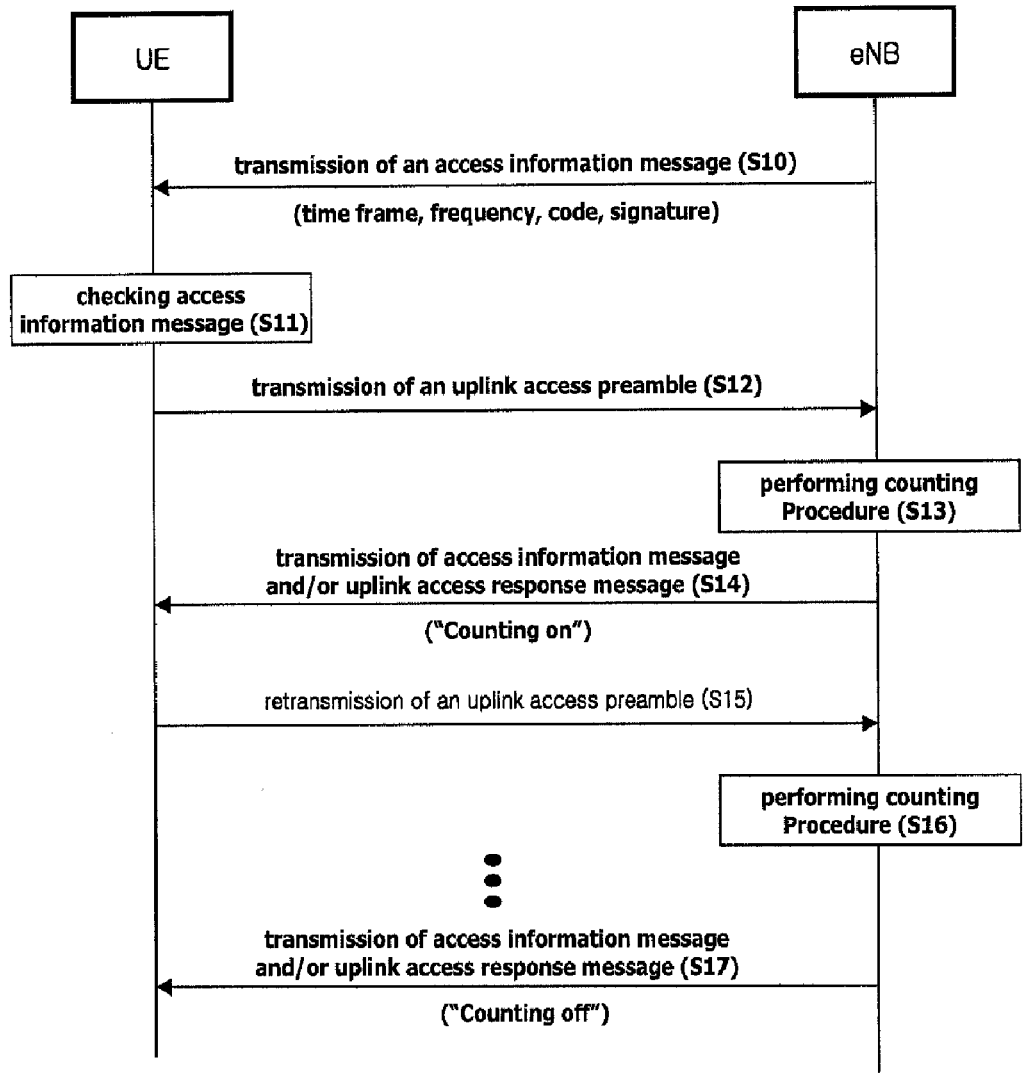
[Fig. 5]

[Fig. 6]
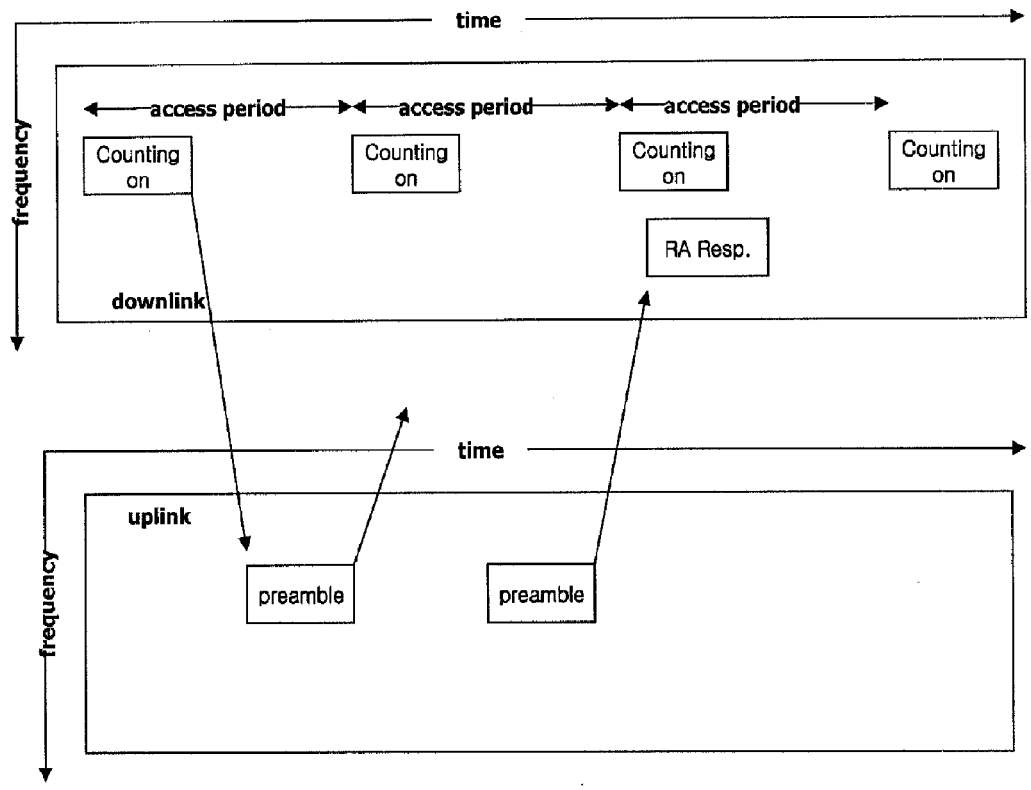
[Fig. 7]
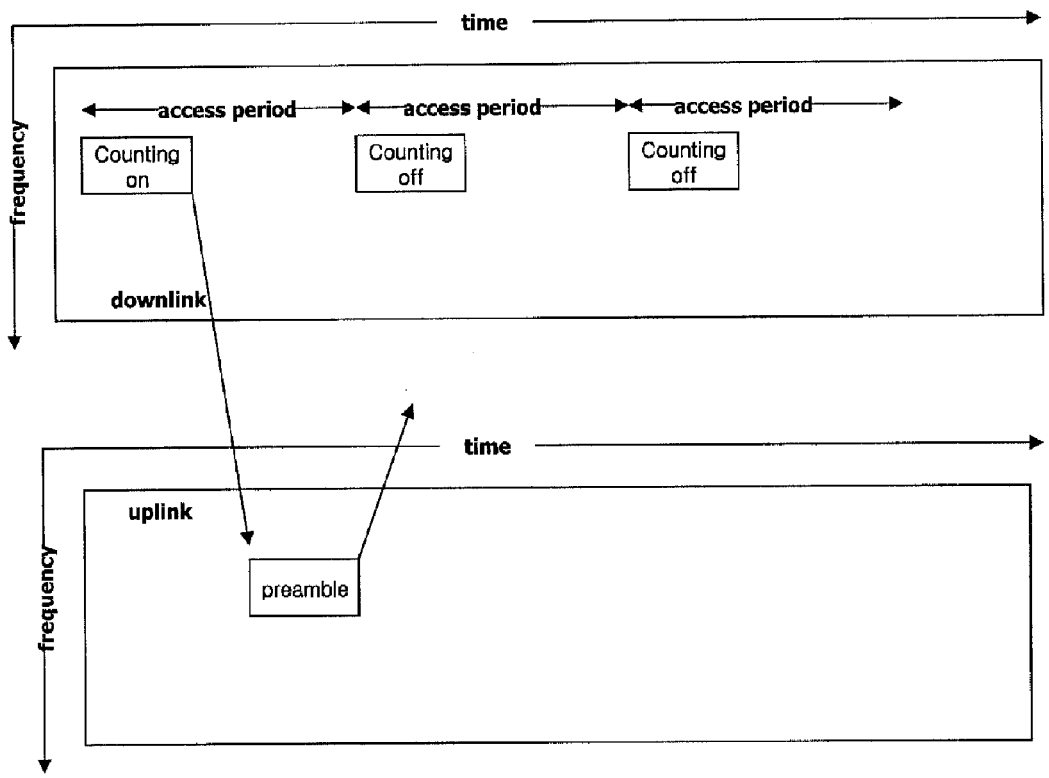

UPLINK ACCESS METHOD OF MOBILE COMMUNICATION SYSTEM

CROSS-REFERENCE TO RELATED APPLICATIONS

This application is the National Stage filing under 35 U.S.C. 371 of International Application No. PCT/KR2007/003020, filed on Jun. 21, 2007, which claims the benefit of earlier filing date and right of priority to Korean Application No. 10-2007-0039943, filed on Apr. 24, 2007, and also claims the benefit of U.S. Provisional Application Ser. No. 60/815,722, filed on Jun. 21, 2006.

DISCLOSURE OF INVENTION

Technical Solution

The present invention relates to uplink access method for transmitting and receiving a point-to-multipoint service (i.e., Multimedia Broadcast Multicast Service (MBMS)) in an E-UMTS (Evolved Universal Mobile Telecommunications System) and, more particularly, a network transmits a response request message with respect to a point-to-multipoint service to a terminal, the terminal transmits a response message using an allocated uplink access preamble included in the response request message, thereby effectively performing a counting procedure with respect to the point-to-multipoint at a minimum overhead.

FIG. 1 is a network structure of the E-UMTS, a mobile communication system applicable to the related art and the present invention.

The E-UMTS system has been evolved from the UMTS system, for which the 3GPP is proceeding with the preparation of the basic specifications applicable thereto. The E-UMTS system may be referred to as an LTE (Long Term Evolution) system.

With reference to FIG. 1, the E-UMTS network includes an E-UTRAN and an EPC (Evolved Packet Core). An interface between the E-UTRAN and the EPC can be used. An S1 interface can be used between the eNodeBs and the EPC. The eNodeBs are connected with each other through an X2 interface, and the X2 interface may be present between adjacent eNodeBs in a meshed network structure.

FIGS. 2 and 3 illustrates a structure of the radio access interface protocol for the E-UMTS.

The radio access interface protocol has horizontal layers including a physical layer, a data link layer and a network layer, and has vertical planes including a user plane for transmitting data information and a control plane for transmitting control signals.

The protocol layers can be divided into a first layer (L1), a second layer (L2) and a third layer (L3) based upon the three lower layers of an open system interconnection (OSI) standard model that is well-known in the art of communication systems.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the second layer provides a service to a radio link control (RLC) layer, an upper layer, via a logical channel. The RLC layer of the second layer supports a reliable data transmission. The function of the RLC layer can be implemented as a function block within the MAC layer, and in this case, the RLC layer may not be present. A PDCP layer of the second layer performs a header compression function for reducing unnecessary control information so that data transmitted by using IP packets such as IPv4 or IPv6 can be effectively transmitted via a radio interface with a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN. A Non-Access Stratum (NAS) layer located on the most upper portion of the RRC layer performs functions such as a SAE (System Architecture Evolution) bearer management, an authentication, an idle mode mobility handling, a paging origination in LTE_IDLE, or a security control for the signalling between aGW and UE, etc.

Downlink transport channels for transmitting data from the network to the terminal, include a broadcast channel (BCH) for transmitting system information and a downlink shared channel (SCH) for transmitting the user traffic or the control message. Downlink multicast, traffic of a broadcast service or a control message can be transmitted through the downlink SCH or through a separate downlink multicast channel (MCH).

Uplink transport channels for transmitting data from the terminal to the network include a random access channel (RACH) for transmitting an initial control message and an uplink SCH for transmitting the user traffic and the control message.

Logical channels located above the transport channels and mapped to the transport channels, include a broadcast control channel (BCCH), a paging control channel (PCCH), a common control channel (CCCH), a multicast control channel and a multicast traffic channel (MTCH).

FIG. 4 shows an exemplary structure of the physical channel. The physical channel transfers signalling and data between the UE Layer 1 (L1) and the eNB Layer 1 (L1). As shown in FIG. 4, the physical channel transfers the signalling and the data, which consists of a plurality of sub-carriers in frequency and a plurality of symbols in time (i.e., 6 or 7 symbols constitute one sub-frame which is 0.5 ms in length). One sub-frame consists of a plurality of resource blocks and one resource block comprises a plurality of symbols and a plurality of sub-carriers. One sub-frame is 0.5 ms and TTI (Transmission Time Interval) which is a unit time for data transmission is 1 ms corresponded to two sub-frames. The particular symbol(s) of the sub-frame (e.g. the first symbol of the sub-frame) can be used for the L1/L2 control channel. The L1/L2 control channel carries L1/L2 control information (signalling).

Usually, a network can perform a MBMS counting procedure if the network needs to know there is any existed terminal that receives a particular MBMS service in a particular cell or needs to count a number of terminals. Here, the MBMS counting procedure is referred that the processing steps of transmitting an access information message via a MCCH (Multicast Control Channel) by the network and transmitting a RRC connection setup message or a cell update message in response to the access information message by the terminal.

In the related art, a RRC connection request message or a cell update message is transmitted via a RACH (Random Access Channel) channel. The RACH channel can be divided into a RACH preamble part and a RACH message part. When the terminal transmits the response message in response to the access information message, the RACH preamble is transmitted first, then the RRC connection message or the cell update message is transmitted through the RACH message to the network.

Thus, in the related art, the RACH preamble has to be transmitted before a transmission of the uplink RACH message. This causes a time delay and/or a great amount of overhead to perform the counting procedure [i.e., MBMS counting procedure].

The present invention has been developed in order to solve the above described problems of the related art. As a result, the present invention may provide a method for transmitting and receiving a point-to-multipoint (i.e., MBMS service) to reduce a time for performing a counting procedure and to minimize an uplink overhead.

To implement at least the above feature in whole or in parts, the present invention may provide a method of receiving a response request with respect to a particular service from a network; transmitting a response message to the network using an allocated uplink access preamble included in the received response request;

The present invention may also provide a method of transmitting a response request with respect to a particular service, wherein the response request includes uplink transmission information related to a preamble that will be used by a terminal for transmitting a response that responds to the response request, wherein the uplink transmission information includes a service dedicated signature; and receiving the response from the terminal that uses the uplink transmission information for a transmission of the response.

The present invention may also provide a mobile terminal for uplink access for a wireless communications system, the mobile terminal comprising: a transceiver adapted to transmit or receive a service data; a memory adapted to store the service data transmitted or received via the transceiver or from an external source; and a processor cooperating with the transceiver and the memory and adapted to perform the steps of, receiving a response request with respect to a service, wherein the response request includes uplink transmission information related to a preamble that will be used for transmitting a response that responds to the response request, wherein the uplink transmission information includes a service dedicated signature; and transmitting the response using the uplink transmission information.

Additional features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

FIG. 1 shows an exemplary network structure of the E-UMTS.

FIG. 2 shows an exemplary structure of the control plane of the radio access interface protocol for the E-UMTS.

FIG. 3 shows an exemplary structure of the user plane of the radio access interface protocol for the E-UMTS.

FIG. 4 shows an exemplary structure of the physical channel.

FIG. 5 shows an exemplary diagram illustrating an uplink access method for a point-to-multipoint service in accordance with the present invention.

FIG. 6 shows an exemplary diagram illustrating a transmission of an uplink access preamble between a terminal and a network when an access information message includes a Counting on in accordance with the present invention.

FIG. 7 shows an exemplary diagram illustrating a transmission of an uplink access preamble between a terminal and a network when an access information message includes a Counting off in accordance with the present invention.

One aspect of the present invention is the recognition by the present inventors regarding the problems and drawbacks of the related art described above and explained in more detail hereafter. Based upon such recognition, the features of the present invention have been developed.

Although the present invention is shown to be implemented in a mobile communication system, such as a UMTS and E-UMTS developed under 3GPP specifications, the present invention can also be applied to other communication systems operating in conformity with different standards and specifications.

Thus, in order to reduce the delays occurring during the counting procedure and to reduce uplink overhead according to the present invention, the mobile terminal receives a response request message with respect to a particular service from the wireless network, then transmits a response message through an uplink access preamble with respect to the particular service that was set in the response request message, and receives a response message with respect to the uplink access preamble from the wireless network.

The response request message may include information related to the uplink access preamble. The information related to the uplink access preamble may include a signature used by the uplink access preamble.

The mobile terminal transmits the signature via the uplink access preamble.

If a positive (affirmative) response with respect to the uplink access preamble is received, the mobile terminal may suspend (or interrupt) the transmission of the uplink access preamble. If a negative response with respect to the uplink access preamble is received, the mobile terminal may continue to transmit the uplink access preamble.

According to the present invention, the wireless network may perform the counting procedure for the particular MBMS service. FIG. 5 shows an exemplary diagram illustrating an uplink access method for a point-to-multipoint service in accordance with the present invention.

In order to begin the counting procedure with respect to a particular service, the wireless network transmits an access information message via a MCCH channel. (S10) The access information message may be transmitted periodically according to the period set by the wireless network. The access information message may include a service identifier with respect to that service or a service identifier with respect to a session of that service, and may include "Counting On" or "Counting Off", etc. to thus indicate (or instruct) whether the counting procedure with respect to that service should proceed or not or to indicate (or instruct) whether an uplink response is needed or not.

Also, the access information message may include uplink transmission information for the uplink access preamble used when transmitting an uplink response with respect to the access information. The uplink transmission information may include a time frame(s) in which the preamble is transmitted, one or more frequencies, code(s), signature(s), and the like. Here, the signature refers to a service-dedicated signature that corresponds to the service. When the service-dedicated signature corresponding to the particular service is allocated, the wireless network may designate (or specify) the time period for when the signature is used or the point in time when the signature use is terminated (i.e., usage termination time), and the information related to such time period or usage termination time may be included in the uplink transmission information together with the signature.

The mobile terminal that wishes to receive the particular service receives the access information message via the MCCH channel, and may check the access information message. (S11) If the access information corresponds to the particular service (namely, if the service identifier with respect to the particular service or the session identifier with respect to a session of the particular service is included in the access information), and also, if the access information indicates (or instructs) the progress (or proceeding) of the counting procedure or if uplink response is requested (i.e., of "Counting On"), the mobile terminal responds to the access information by using the uplink transmission information included in the access information. Here, the mobile terminal responds by using an uplink access preamble. (S12) The preamble used by the mobile terminal transmits the signature or code included in the uplink transmission information, and transmission on the uplink is performed upon being adapted to the time frame and frequency included in the uplink transmission information. Specifically, those mobile terminals wishing to receive the particular service transmit the uplink access preamble, by using the service-dedicated signature corresponding to the particular service, during the time period or until the usage termination time The wireless network attempts reception of the uplink access preamble according to the uplink transmission information. The uplink access preamble includes the service-dedicated signature. Accordingly, the wireless network may simultaneously receive the same service-dedicated signature from a plurality of mobile terminals via the same sub-carrier. Because multiple mobile terminals transmit with the same signature, the wireless network cannot distinguish each of the mobile terminals, and if multiple mobile terminals transmitted the same service-dedicated signature, a single uplink access preamble that transmits the same service-dedicated signature is received. Here, as the number of mobile terminals that transmit the same preamble increases, the probability for the wireless network of receiving a preamble having even greater energy is increased. Upon receiving the uplink access preamble, the wireless network may measure the reception energy or power of the preamble, and such measured energy or power may be used to determine the existence of any mobile terminals wishing to receive the service in the current cell and to determine the approximate total number of mobile terminals. (S13) For example, a threshold value for the energy or power may be set, and if the reception energy or power of the service-dedicated signature(s) received during a certain period of time is found to exceed a particular threshold value, it would be determined that one or more mobile terminals wishing to receive the particular service exists in the current cell, and otherwise, it can be determined that there are no mobile terminals wishing to receive the particular service within the current cell.

When the wireless network receives the uplink access preamble, a response may be performed in two ways. The first method is to respond via an access information message. (S14) As the access information message is transmitted periodically, a single access information message may simultaneously provide responses with respect to preambles transmitted for the particular service during a previous access period. The second method is to respond via an uplink access response message. (S14) In this case, the uplink access response message is transmitted on the downlink during a particular time period after receiving the preamble, and includes a service identifier or session identifier of the particular service and a service-dedicated signature, a positive response or negative response information. In response to the uplink access preamble, the wireless network may transmit an access information message or an uplink access response message, or an access information message and an uplink access response message may be transmitted together.

The wireless network may transmit the uplink access response message via a downlink SCH channel. In this case, a L1/L2 control channel (PDCCH) for the downlink SCH channel may inform whether the uplink access response message is transmitted or not, and the L1/L2 control channel also inform a radio resource that used for transmitting the uplink access response message. Here, in order to inform whether the uplink access response message is transmitted or not, the L1/L2 control channel may transmit a service identity/session identity of the service, a MBMS RNTI (Radio Network Temporary Identity) that corresponds with the service identity, a RA-RNTI (Random Access RNTI) that corresponds with the uplink access preamble, or a RA-RNTI that used for all MBMS in a corresponding cell.

The terminal may receive the L1/L2 control channel, and the terminal may receive the uplink access response message via the downlink SCH channel when the L1/L2 control channel includes the identity described above. When the terminal fails to receive the uplink access response message that responds to a previously transmitted uplink access preamble, the terminal may retransmit the uplink access preamble after certain time period. (S15) To do this, the terminal may re-obtain uplink transmission information by receiving the access information again. Thereafter, the terminal may retransmit the uplink preamble using the re-obtained uplink transmission information. Or, the terminal may retransmit the uplink access preamble according to an access information message by receiving transmitted access information in next access period after transmitting the uplink access preamble in current access period.

To be more specific, the terminal may receive a transmitted access information message in next (coming) access period, in case of an uplink access preamble is transmitted, an uplink access response message with respect to a transmitted uplink access preamble is not received, or an uplink access response message with respect to a transmitted uplink access preamble is received but it contains a negative response. Here, the uplink access preamble may be retransmitted (S15) when the access information indicates to perform a counting procedure or to request an uplink response [i.e., access information indicates "Counting on"] (S14). The uplink access preamble may not be retransmitted when the access information indicates to stop performing of the counting procedure or not to request an uplink response [i.e., access information indicates "Counting off"] (S17).

The terminal may terminate a retransmission of an uplink access preamble, in case of the terminal receives a response message after transmitting an uplink access preamble but it contains a negative response, or such negative response indicates to stop a transmission of the uplink access preamble. If the negative response of the uplink access response message includes uplink access delay time information, the terminal may retransmit the uplink access preamble only after such delay time. In this case, the terminal may retransmit [i.e., "Counting on"] or may terminate to retransmit [i.e., "Counting off"] the uplink access preamble according to an access information message which is a transmitting access information message after the delay time.

If terminal receives an access information message and the received access information message indicates a "Counting off" with having a delay time, the terminal may retransmit the uplink access preamble after such delay time. Namely, the terminal may receive a transmitting access information message after the delay time, then may retransmit the uplink access preamble based on the access information that indicates a "Counting on", or may terminate to retransmit the uplink access preamble based on the access information that indicates a "Counting off."

When the terminal retransmits the uplink access preamble, within a duration time or before a usage termination time, the terminal may retransmit the uplink access preamble using a previously used service dedicated signature. If recently received access information message transmits a new service dedicated signature, the terminal may retransmit the uplink access preamble using the new service dedicated signature instead of using the previously used service dedicated signature. Also, if the terminal tries to retransmit the uplink access preamble beyond the duration of time or after the usage termination time, the terminal may need to receive information related to a new service dedicated signature again by receiving access information one more time. As such, in this case, the terminal may have to retransmit the uplink access preamble with using the new service dedicated signature only.

The terminal may transmit an uplink access preamble by selecting random signature when a previously service dedicated signature is no longer to be used (i.e., when the terminal retransmit an uplink access preamble beyond the duration of time or after the usage termination time and the terminal can not receive an access information) Here, when the terminal receives a response in response to the uplink access preamble, the terminal may transmit a service identity (for a service that the terminal wishes to receive), a session identity, or the like parameters via an uplink SCH channel to a wireless network.

The wireless network may try to receive an uplink access preamble based on uplink transmission information, may perform counting procedure for a number of the uplink access preamble. (S16) When the wireless network receives enough numbers of the uplink access preamble, the wireless network may broadcast to terminate the counting procedure through access information message. Also, the wireless network may broadcast to request a termination of a transmission of the uplink access preamble. (S17)

Namely, as illustrated in FIG. 7, the wireless network may indicate "Counting off" via an access information message to the terminal that wishes to receive a particular service or already received the particular service. When the wireless network does not receive enough number of the uplink access preamble, the wireless network may broadcast to continue to perform the counting procedure and to request the transmission of the uplink access preamble. As such, as illustrated in FIG. 6, the wireless network may indicate "Counting on" via the access information message to the terminal that wishes to receive a particular service or already received the particular service.

The present invention may provide a method of uplink access for a wireless communications system, the method comprising: receiving a response request with respect to a service, wherein the response request includes uplink transmission information related to a preamble that will be used for transmitting a response that responds to the response request, wherein the uplink transmission information includes a service dedicated signature; and transmitting the response using the uplink transmission information, wherein the response request is an access information message, the response request is received through a MCCH (Multicast Control Channel), the response request is used for counting a number of terminals that subscribed to the service, the service is related to at least one of a point to multipoint service, a multicast service, a broadcast service, and a multimedia service, the response request includes at least one of a service identity, a session identity, a Counting on, or a Counting off, the uplink transmission information includes at least one of a time frame for a transmission of the preamble, a frequency of the preamble, a preamble code, or a signature of the preamble, the response includes a service identity or a session identity, the response is transmitted to a network only if the response request includes the Counting on, a transmission of preamble is stopped if a positive response with respect to a previously transmitted preamble is received from a network, and the transmission of the preamble continues if a negative response with respect to previously transmitted preamble is received from the network, receiving a response message in response to the transmitted response, the response message is either an access information message or an uplink access response message received on a downlink SCH, retransmitting the response if the response message is not received within a certain time frame, a duration time or a termination time for using the service dedicated signature is set by a network, information related to the duration time or the termination time for using the service dedicated signature is included in the uplink transmission information, the service dedicated signature is retransmitted by the network when previously received service dedicate signature was not used in the duration time or before the termination time, a MBMS Radio Network Temporary Identity (RNTI) that corresponds to a service identity is received through a PDCCH (Physical Dedicated Control Channel).

The present invention may also provide a method of uplink access in a wireless communications system, the method comprising: transmitting a response request with respect to a service, wherein the response request includes uplink transmission information related to a preamble that will be used by a terminal for transmitting a response that responds to the response request, wherein the uplink transmission information includes a service dedicated signature; and receiving the response from the terminal that uses the uplink transmission information for a transmission of the response, the response request is an access information message, the response request is used for counting a number of terminals that subscribed to the service and the response request is transmitted through a MCCH (Multicast Control Channel), the service is related to at least one of a point to multipoint service, a multicast service, a broadcast service, and a multimedia service, the response request includes at least one of a service identity, a session identity, a Counting on, or a Counting off, the uplink transmission information includes at least one of a time frame for a transmission of the preamble, a frequency of the preamble, a preamble code, or a signature of the preamble, the response includes a service identity or a session identity, transmitting a response message in response to the received response, the response message is either an access information message or an uplink access response message received on a downlink SCH, setting a duration time or a termination time for using the service dedicated signature, information related to the duration time or the termination time for using the service dedicated signature is included in the uplink transmission information, retransmitting the service dedicated signature when previously transmitted service dedicate signature was not used by the terminal in the duration time or before the termination time, a MBMS Radio Network Temporary Identity (RNTI) that corresponds to a service identity is transmitted to the terminal through a PDCCH (Physical Dedicated Control Channel).

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of uplink access for a wireless communication system, the method comprising:
   receiving a response request corresponding to a particular service;
   and transmitting a response using uplink transmission information,
   wherein:
      the response request includes uplink transmission information related to a preamble, is used for counting a number of terminals that subscribed to the particular service, and is received through a Multicast Control Channel (MCCH);
      the preamble is used for transmitting the response to the response request;
      the uplink transmission information includes a service dedicated signature; and
      the service dedicated signature is used only for the particular service, is included in the preamble, and is used in a Random Access Channel (RACH) procedure for an uplink transmission.

2. The method of claim 1, wherein the response request is an access information message.

3. The method of claim 1, wherein the particular service is related to at least a point-to-multipoint service, a multicast service, a broadcast service or a multimedia service.

4. The method of claim 1, wherein the response request includes at least a service identity, a session identity, a counting on of a counting procedure for the particular service or a counting off of the counting procedure for the particular service.

5. The method of claim 4, further comprising the response is transmitted only when the response request includes the counting on of the counting procedure for the particular service.

6. The method of claim 1, wherein the uplink transmission information further includes at least a time frame for the uplink transmission of the preamble, a frequency of the preamble, a preamble code or a signature of the preamble.

7. The method of claim 1, wherein the response includes a service identity or a session identity.

8. The method of claim 1, wherein:
   the uplink transmission of the preamble is stopped when a positive response to a previously transmitted preamble is received from a network; and
   the transmission of the preamble continues when a negative response to the previously transmitted preamble is received from the network.

9. The method of claim 1 further comprising receiving a response message in response to the transmitted response.

10. The method of claim 9, wherein the response message is an access information message or an uplink access response message received on a downlink Shared Channel (SCH).

11. The method of claim 9, further comprising retransmitting the response when the response message is not received within a certain time frame.

12. The method of claim 1, wherein a time duration or a termination time for using the service dedicated signature is set by a network.

13. The method of claim 12, wherein information related to the set time duration or the set termination time is included in the uplink transmission information.

14. The method of claim 13, wherein the service dedicated signature is re-transmitting by the network when a previously received service dedicated signature was not used within the set time duration or before the set termination time.

15. The method of claim 1, further comprising receiving a Multimedia Broadcast Multicast Service (MBMS) Radio Network Temporary Identity (RNTI) that corresponds to a service identity through a Physical Dedicated Control Channel (PDCCH).

16. A method of uplink access in a wireless communication system, the method comprising:
    transmitting a response request corresponding to a particular service; and
    receiving a response that is transmitted using uplink transmission information,
    wherein:
        the response request includes uplink transmission information related to a preamble, is used for counting a number of terminals that subscribed to the particular service, and is received through a Multicast Control Channel (MCCH);
        the preamble is used for transmitting the response to the response request;
        the uplink transmission information includes a service dedicated signature; and
        the service dedicated signature is used only for the particular service, is included in the preamble, and is used in a Random Access Channel (RACH) procedure for an uplink transmission.

17. The method of claim 16, wherein the response request is an access information message.

18. The method of claim 16, wherein the particular service is related to at least a point-to-multipoint service, a multicast service, a broadcast service or a multimedia service.

19. The method of claim 16, wherein the response request includes at least a service identity, a session identity, a counting on of a counting procedure for the particular service or a counting off of a counting procedure for the particular service.

20. The method of claim 16, wherein the uplink transmission information includes at least a time frame for an uplink transmission of the preamble, a frequency of the preamble, a preamble code or a signature of the preamble.

21. The method of claim 16, wherein the response includes a service identity or a session identity.

22. The method of claim 16, further comprising transmitting a response message in response to the received response.

23. The method of claim 22, wherein the response message is an access information message or an uplink access response message received on a downlink Shared Channel (SCH).

24. The method of claim 16, further comprising setting a time duration or a termination time for using the service dedicated signature.

25. The method of claim 24, wherein information related to the set time duration or the set termination time is included in the uplink transmission information.

26. The method of claim 25, further comprising re-transmitting the service dedicated signature when a previously transmitted service dedicated signature was not used by the terminal within the set time duration or before the set termination time.

27. The method of claim 16, further comprising transmitting a Multimedia Broadcast Multicast Service (MBMS) Radio Network Temporary Identity (RNTI) that corresponds to a service identity through a Physical Dedicated Control Channel (PDCCH).

* * * * *